Nov. 22, 1966  J. E. McWILLIAMS  3,286,811
SELECTIVE DELIVERY TILTING SLAT CONVEYOR
FOR MAIL BAG HANDLING SYSTEMS
Filed Dec. 31, 1964  3 Sheets-Sheet 1
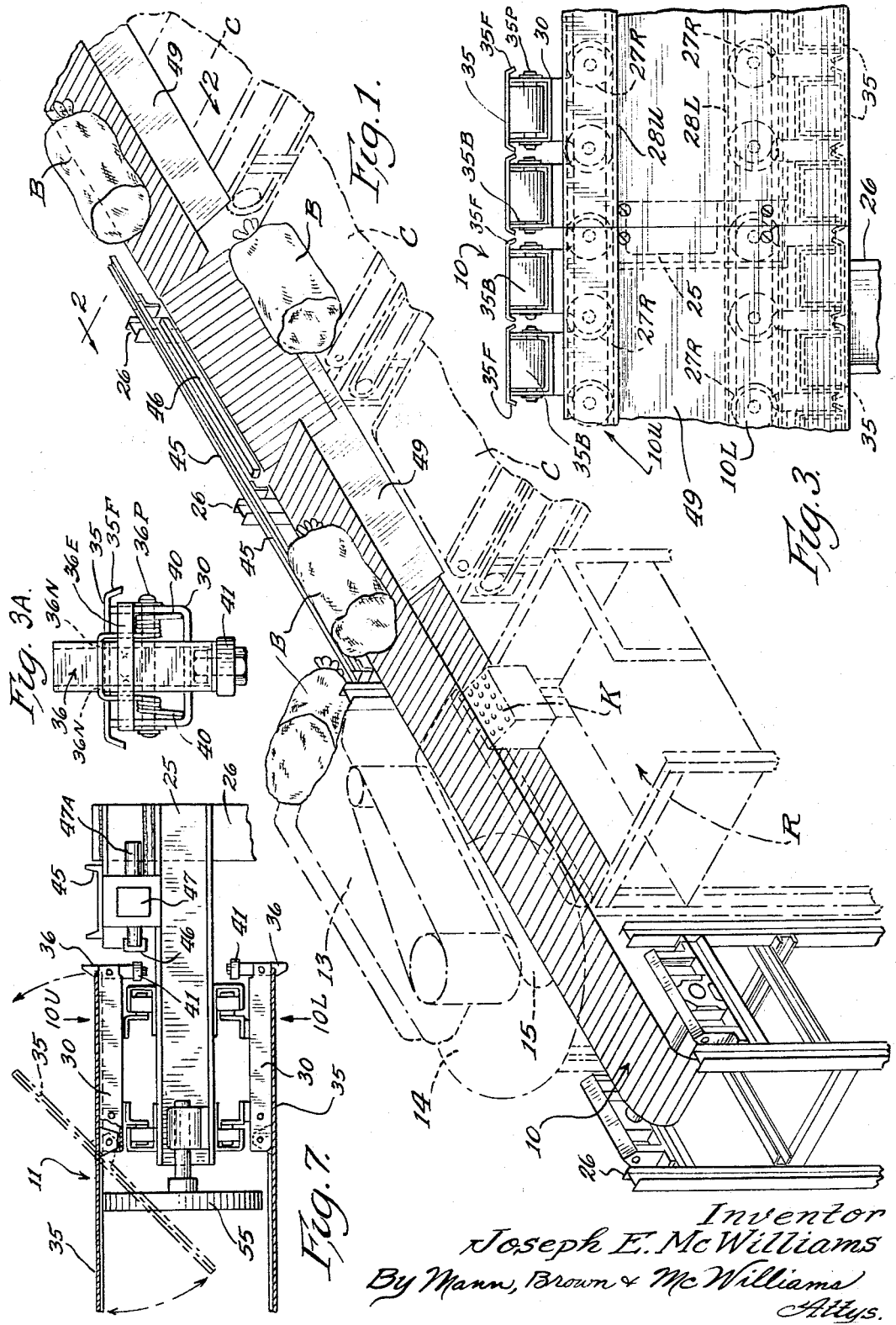
Inventor
Joseph E. McWilliams
By Mann, Brown & McWilliams
Attys.

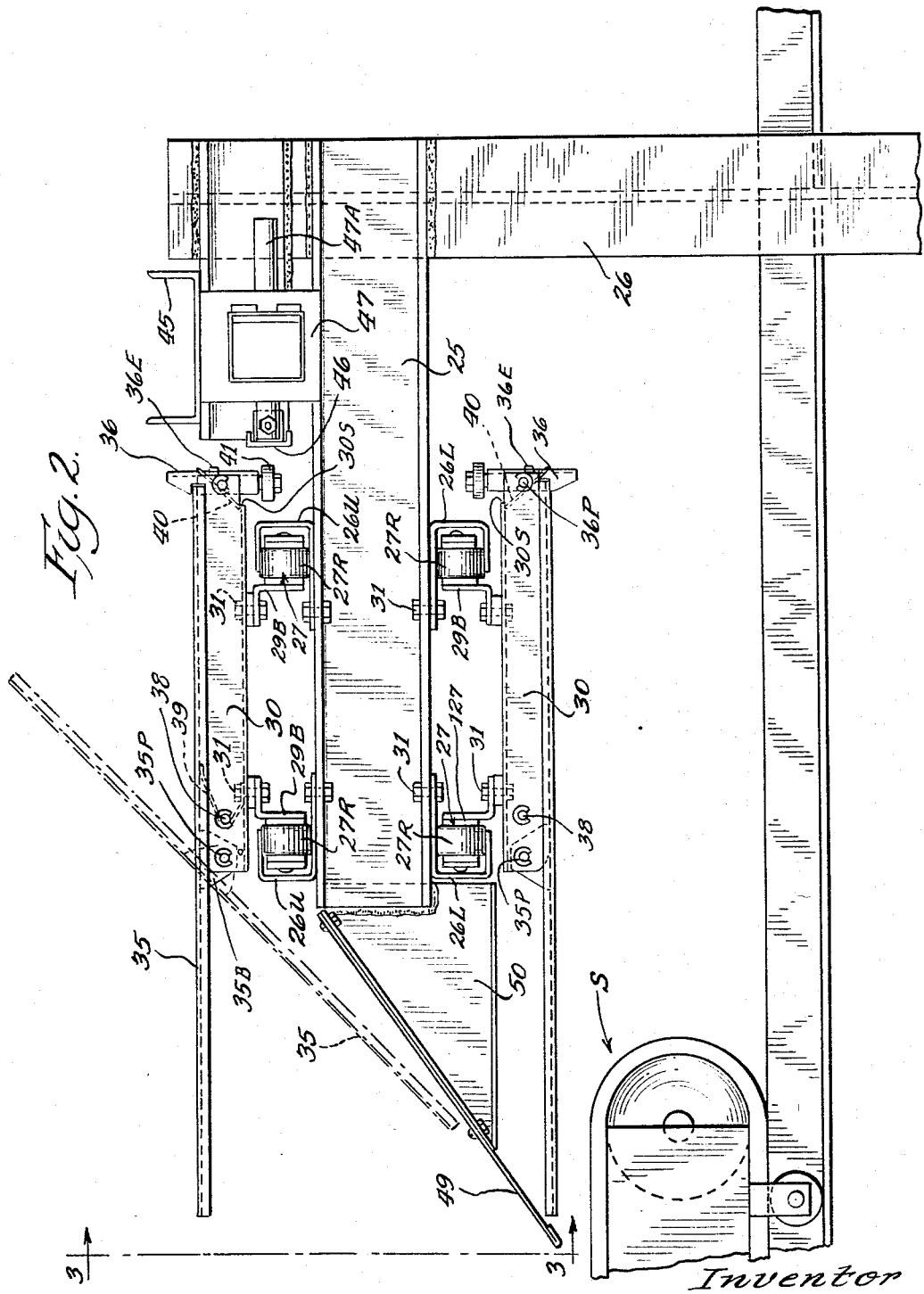

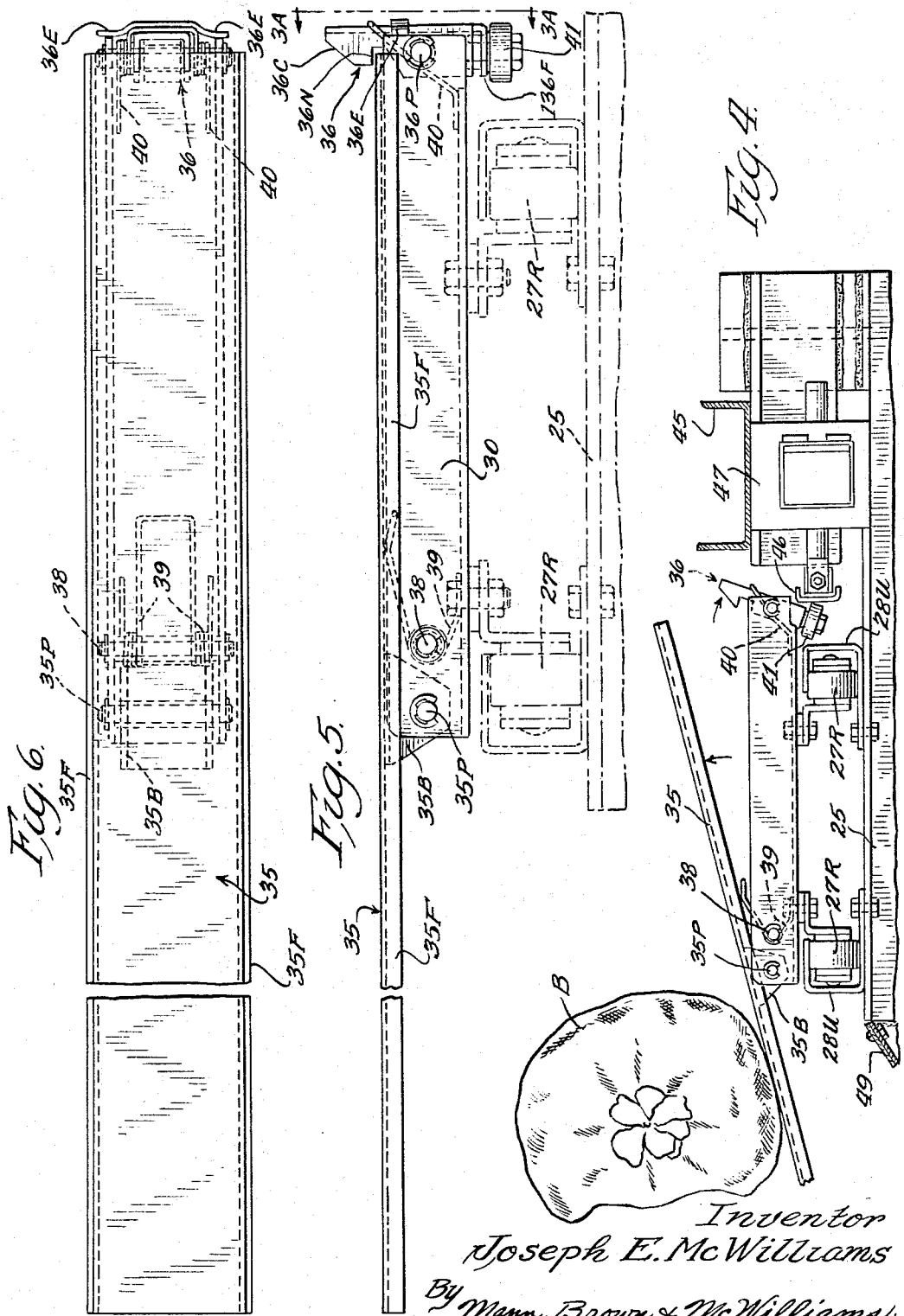

United States Patent Office 3,286,811
Patented Nov. 22, 1966

3,286,811
SELECTIVE DELIVERY TILTING SLAT CONVEYOR
FOR MAIL BAG HANDLING SYSTEMS
Joseph E. McWilliams, 1345 Canterbury Lane,
Glenview, Ill.
Filed Dec. 31, 1964, Ser. No. 422,680
3 Claims. (Cl. 198—38)

This invention relates to endless conveyors especially adapted for use in handling bagged mail and involves conveyors of the kind wherein an upper run of the conveyor provides a moving, load-supporting surface; more particularly the invention relates to slat conveyors wherein the load-supporting surface of the conveyor is provided by a series of slats carried by parallel endless loops of roller chain, with the invention being directed to make the conveyor self unloading and yet permit handling of the bags on the conveyor at random intervals.

Slat conveyors in general have long been used in situations where the weight or some other characteristic of the load made the use of a belt conveyor undesirable, and in space and mounting requirements slat conveyors and belt conveyors have been considered to be quite similar. Such prior conveyors have also had similar requirements in the type of unloading or diverting equipment required where articles were to be unloaded at different selected positions or stations along the conveyor. Thus it has been customary in such situations, to provide a power operated push-off or diverting mechanism at each unloading position, and such mechanisms were located at one side of the conveyor and above the level of the upper run of the conveyor. Such power operated mechanism thus required added head-room for installation and were thus objectionable in many instances.

In view of the foregoing it is the primary object of this invention to provide an improved slat type conveyor that is self-unloading in character, and objects related to the foregoing are to provide such a slat conveyor wherein the slats are self-unloading in character, and objects related to the foregoing are to provide such a slat conveyor wherein the slats are mounted for tilting movement from a normal horizontal load-carrying position to a downwardly sloped relation wherein a load will slide laterally off of the conveyor; to latch the slats individually in their horizontal position and to unlatch groups of slats in unison according to the size of load that is contemplated, and to restore the slats to their latched positions individually and in succession near the end of the upper run of the conveyor.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:
FIG. 1 is a fragmentary perspective view showing a slat conveyor embodying the features of the invention;
FIG. 2 is a fragmentary vertical sectional view taken along the line 2—2 in FIG. 1;
FIG. 3 is a front elevational view of a short section of the conveyor as viewed from the line 3—3 of FIG. 2;
FIG. 3A is a detail view of the latch taken from the line 3A—3A of FIG. 5;
FIG. 4 is an enlarged portion of FIG. 2 showing the upper run of the conveyor with a group of slats unlatched and tilted part way to their unloading positions;
FIG. 5 is an enlarged portion of FIG. 4;
FIG. 6 is a plan view of the FIG. 5 structure; and
FIG. 7 is a view similar to FIG. 2 and showing the slat restoring means.

For purposes of disclosure the invention is herein illustrated as embodied in a slat conveyor 10 forming the selective distributing conveyor of a bagged mail sorting and loading installation of the general type described in my copending application Serial No. 139,526, filed Sept. 20, 1961, now Patent 3,164,271, granted Jan. 5, 1965. Thus in such an installation loaded mail bags B that are tagged as to destination, are advanced in similarly oriented relation by a conveyor 13 to an elevated relation adjacent the loading end of the distributing conveyor 10, and after being discharged onto the edge of a rotating platform 14, have their direction of movement reversed so as to drop off the platform 14 onto a short belt conveyor 15 that is located just above the conveyor 10. The short belt conveyor constitutes part of a routing station R where a worker reads the destination tag of a mail bag B, and then by actuation of a keyboard K of a storage or memory unit, the operator designates that the particular mail bag B is to be discharged at a predetermined one of a plurality of collecting stations C disposed at intervals along the distributing conveyor 10. Such selective discharge of individual packages, bags or the like is accomplished by the slat conveyor 10 of this invention without the necessity for use of overhead pushers, diverters or the like, as will be apparent from the following specific description of the conveyor 10 and its operation.

Thus, as shown in FIGS. 1 and 2, the conveyor 10 is supported on end portions of cantilever beams 25 that project from upright columns 26, and the general arrangement is such that the upper run 10U of the conveyor 10 runs above the cantilever beams 25, while the lower run 10L is disposed beneath the beams 25. The conveyor 10 is formed basically by two endless roller chains 27, the rollers 27R of which run in upper and lower supporting channels 28U and 28L carried on the beams 25. The roller chains 27 run about conventional sprockets (not shown) that form the usual end pulley means at opposite ends of the conveyor 10, which, as indicated by FIGURE 1, are mounted to rotate about substantially horizontal axes so that the runs 10U and 10L are disposed one above the other in a vertical plane. The adjacent links 127 of the chains 27 have angle brackets 29B welded thereto and spacing channels 30 are secured by bolts 31 so that the rollers 27R are held in the supporting and guiding channels 28U and 28L and channels 30 are connected together longitudinally of the conveyor in articulated relation.

The spacing channels 30 project at their opposite ends beyond the brackets 29B and the roller chains 27, and each channel 30 serves as an individual mounting base for pivotally supporting a slat 35 and an associated latch 36. Thus, the slats 35 have a length that is substantially twice that of the channels 30, as will be evident in FIG. 2, and each slat 35 and pivot means at the left end of the channel 30 is associated with the substantial midpoint of the slat 35 so that the slat 35 may pivot from a sloping position shown in dotted lines in FIG. 2 to a horizontal position, shown in solid lines, wherein the right hand end of the slat 35 is engaged by its latch 36 so as to be held in its horizontal position.

The slats 35 are in the form of flat metal plates or strips downwardly flanged at 35F along their opposite edges as shown in FIG. 2, and the flat portions of the slats are of a width slightly greater than the channels 30 so that U-shaped brackets 35B welded to the bottoms of the slats midway between their ends, may project downwardly between the flanges of the channels 30. Pivot pins 35P extend through the flanges of the channels 30 and through the brackets 35F to provide the pivotal mounting for the slats. Just to the right of each pivot pin 35P, a spring mounting pin 38 extends between the flanges of the channel 30, and a torsion spring 39 surrounding the pin 38 has its opposite arms engaging the web of the channel 30 and the overlying portion of the slat 35 so as to urge the slat 35 toward its downwardly sloping position. The action of the spring 39 is of course governed and controlled by the individual latch 36 acting on each slat 35.

Each latch 36 is formed as a channel-shaped sheet metal stamping, and a horizontal pivot pin 36P extends through the flanges of the latch 36 and the flanges of the channel 30 to pivotally mount the latch member near the right hand end of the channel 30 as shown in FIG. 5, the web of the channel being slotted at 30S, FIG. 2, to provide clearance for the lower end of the latch.

A torsion spring 40 surrounds the pivot pin 36P on opposite sides of the latch 36 and its arms engage the web of the channel 30 and the upper portion of the latch 36 in such a way as to yieldingly urge the latch 36 in a counterclockwise direction, as shown in FIG. 5, toward the latching position wherein notches 36N in the flanges of the latch embrace the adjacent end of the slat 35 to hold the same in its horizontal position.

When the latch 30 is being returned in a clockwise direction, as viewed in FIGS. 4 and 5, toward its latched position, the end edge of the slot 55 is arranged to engage a sloping cam surface 36C on the upper end portions of the flanges of the latch to pivot the latch 36 out of the way and thus allow the end of the slat 35 to move into alignment with the notches 36N. The spring 40 then returns the latch to its latching position of FIG. 5 so as to hold the slat 35 in its horizontal position. When the latch 36 has been released, the latch is held against excessive movement in a counterclockwise direction by engagement of ears 36E on the latch with the ends of the flanges of the channel 30, as will be evident in FIGS. 3A, 5 and 6.

At its lower end, each latch has an inturned flange 136F upon which a roller 41 is suspended on a vertical axis for engagement, as will be hereinafter described, when the related latch is to be released.

It has been pointed out hereinabove that the slats 35 may be unlatched in groups, the size of these groups being governed by the maximum size of the articles that are to be carried on the conveyor 10. Thus, as shown in FIGS. 1, 2 and 4, supporting channels 45 are extended between the adjacent columns just rearwardly of the upper run of the conveyor, and beneath the channels 45, release bars 46 are supported in the horizontal plane of the rollers 41 so that these release bars 46 may be moved forwardly or to the left as shown in FIG. 2 to engage a number of rollers 41 and simultaneously release the associated latches 36. In the present instance, each release bar 46 is movably mounted as aforesaid by securing the opposite ends of the release bar to the horizontally slidable armatures 47A of a pair of solenoids 47 that are suspended from the bottom of the mounting channels 45.

Thus, when the selected group of slats 36 has moved into position opposite a selected release bar 46, the two supporting solenoids 47 are simultaneously energized, as for example under control of the routing mechanism above mentioned, and this moves the release bar 46 to the left in FIG. 2. Thus the group of slats 35 is released so as to allow the slats to move to their broken line release position of FIG. 2 and thereby cause the load such as a bag B to slide downwardly by gravity into a desired position such as the top of a related collecting station S. In this respect it is noted that in their downward movement, the left hand ends of the slats 35 as viewed in FIG. 2 move downwardly into contact with a protecting and guiding surface 49, FIGS. 1 and 2, which is supported by brackets 50 and which in effect provides a downward sloping continuation surface upon which the load may slide past the slats of the lower run after such load has moved off the lower ends of the group of slats upon which it has been carried.

When a released group of slats 36 has moved throughout the length of the upper run of the conveyor, the downwardly sloping ends of the slats 36 moves into contact with the surface of a rotatable restoring wheel 55, FIG. 7, so that the slats are coerced in a clockwise direction to the solid line position of FIG. 7, and during this movement the latch 36 of each slat is first moved to its released position and when the slat reaches its horizontal position, the latch returns to its latching position so that the slat is thereafter held in a horizontal position during continued movement of the conveyor.

It will be apparent that with the structure that is thus provided, the self-unloading slat conveyor may be mounted within a space that has very little head room, and its unloading operation is achieved by mechanism that is disposed at substantially the level of the upper run of the conveyor.

The present slat conveyor of course is of such a structure that the upper and lower runs thereof may be disposed reasonably close to each other, and it will be apparent that according to the particular use to which a conveyor is to be put, the number of slats 36 would be released at a particular location along the conveyor and may be adjustably determined by the length of the release rod 46 so as to adapt a standard conveyor to the particular use contemplated.

Thus, while a preferred embodiment of the invention has been illustrated herein, it is to be understood that changes and variations may be made by those skilled in the art without departing from the spirit and scope of the appended claims.

I claim:

1. In a mail bag handling system including a conveying means for moving the bags along a predetermined path past a series of one or more unloading stations at one side of the conveying means, the improvement wherein said conveying means comprises:

an endless articulated conveyor including means for training same to define same into vertically aligned and superposed upper and lower substantially horizontally disposed runs and means for driving same at a uniform speed longitudinally thereof, said conveyor comprising:

a plurality of spacing members extending transversely of the conveyor and connected together longitudinally of the conveyor in articulated relation, a slat carried by each of said spacing members and extending transversely of the conveyor, said slats being proportioned to overhang said one side of said conveyor, said slats defining substantially flat load support surfaces that are oriented to face upwardly when the respective slats are disposed in said upper run, said slats being secured to their respective spacing members for pivotal movement about like aligned axes, extending longitudinally of said conveyor, between a horizontally disposed loading supporting position and a downwardly inclinded load discharging position, said slats being disposed to present said load supporting surfaces of the slats when in said upper run and in said load support position in coplanar closely spaced relation, said axes being disposed adjacent said one side of the conveyor, said slats being formed so that said load support surfaces of said slats when in said upper run and in said load support position provide an elongate substantially planar support for mail bags that extends substantially the full length of said run whereby mail bags may be placed at random positions on said conveyor run lengthwise of the conveyor, means for biasing said slats to pivot to said load discharging position, a releasable latch device acting between each spacing member and the slat it carries to releasably secure the respective slats in their load supporting positions against the action of said biasing means, said latch devices being operable independently of each other, means for selectively releasing at a selected one of said unloading stations the latch devices of the group of slats supporting a particular mail bag to be discharged at that unloading station, including means for simultaneously releasing the latch devices of the slats of such group on operation of said selectively releasing means, and means for restoring the released slats to their latched positions after discharge of a mail bag at a selected unloading station, whereby individual mail bags may be loaded on said conveyor at random positions lengthwise of said upper run and discharged at their destined unloading stations by releasing at said station the slats that support same.

2. The improvement set forth in claim 1 wherein:

said latch devices are disposed at the other side of said conveyor, said releasing means comprising latch release means located at each unloading station at said other side of said conveyor and including means for engaging the latch devices of the load carrying group of slats passing same to release same in operation of said releasing means, said latch devices carrying rollers for engagement by said latch release means whereby movement of the conveyor may be continuous and uninterrupted during operation of said releasing means.

3. The improvement set forth in claim 1 including:

inclined mail bag guiding surfaces mounted at each of said stations on said one side of said conveyor that incline downwardly away from said conveyor and are positioned to be engaged by the overhanging ends of said slats when in their load discharging positions to unload a mail bag at a selected unloading station, said surfaces guiding the downward descent of the unloaded mail bag after it leaves its supporting slats, said surfaces being rectilinear longitudinally of the conveyor.

References Cited by the Examiner

UNITED STATES PATENTS 3,147,845  9/1964  Harrison _____ 198—38

FOREIGN PATENTS 1,006,789  4/1957  Germany.
591,576  8/1947  Great Britain.

EVON C. BLUNK, *Primary Examiner.*

RICHARD E. AEGERTER, *Examiner.*